(12) United States Patent
Do et al.

(10) Patent No.: US 10,255,772 B2
(45) Date of Patent: *Apr. 9, 2019

(54) TACTILE INFORMATION SUPPLY MODULE

(71) Applicant: CK MATERIALS LAB CO., LTD., Seoul (KR)

(72) Inventors: Seoung Hun Do, Seoul (KR); Hyeong Jun Kim, Seoul (KR)

(73) Assignee: CK MATERIALS LAB CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/034,784

(22) Filed: Jul. 13, 2018

(65) Prior Publication Data

US 2018/0330583 A1  Nov. 15, 2018

Related U.S. Application Data

(62) Division of application No. 15/683,178, filed on Aug. 22, 2017, now Pat. No. 10,049,539, which is a
(Continued)

(30) Foreign Application Priority Data

Jul. 28, 2014  (KR) .................. 10-2014-0095945
Dec. 5, 2014   (KR) .................. 10-2014-0173732

(51) Int. Cl.
*G08B 6/00*   (2006.01)
*F16F 6/00*   (2006.01)
(Continued)

(52) U.S. Cl.
CPC ............... *G08B 6/00* (2013.01); *B06B 1/045* (2013.01); *F16F 6/00* (2013.01); *G06F 3/01* (2013.01);
(Continued)

(58) Field of Classification Search
CPC . G08B 6/00; G06F 3/046; G06F 3/016; G06F 3/01; B29C 59/02; B29C 59/18;
(Continued)

(56) References Cited

U.S. PATENT DOCUMENTS 7,777,137 B2   8/2010   Ann et al.
9,017,795 B2   4/2015   Keefe et al.
(Continued)

FOREIGN PATENT DOCUMENTS

KR   1020070093251   9/2007
KR   1020090058024   6/2009
(Continued)

OTHER PUBLICATIONS

European Search Report—European Application No. 15827107.2, dated Feb. 7, 2018, citing US 2012/062371 and US 2007/211032.

*Primary Examiner* — Ali Neyzari
(74) *Attorney, Agent, or Firm* — Cantor Colburn LLP

(57) ABSTRACT

Provided is a tactile information supply module. The tactile information supply module includes a receiver for receiving message information from the outside, a controller for converting the message information into a tactile signal, and an operator for providing tactile information to a user based on the tactile signal, wherein the operator includes at least one tactile sensation provider comprising magnetic particles and a matrix material, and wherein the tactile sensation provider is transformed in response to an external magnetic field to provide the tactile information.

11 Claims, 17 Drawing Sheets

Related U.S. Application Data division of application No. 14/894,771, filed as application No. PCT/KR2015/007849 on Jul. 28, 2015, now Pat. No. 9,773,389.

(51) Int. Cl.
| | | |
|---|---|---|
| *G06F 3/01* | (2006.01) | |
| *B06B 1/04* | (2006.01) | |
| *G06F 3/046* | (2006.01) | |
| *G09B 21/00* | (2006.01) | |
| *B29C 59/02* | (2006.01) | |
| *H01F 7/126* | (2006.01) | |

(52) U.S. Cl.
CPC .............. *G06F 3/016* (2013.01); *G06F 3/046* (2013.01); *G09B 21/004* (2013.01); *B29C 59/02* (2013.01); *H01F 7/126* (2013.01)

(58) Field of Classification Search
CPC . H01F 7/126; B44C 1/005; F16F 6/00; B06B 3/045; G09B 21/004
USPC .......................................... 340/10.1; 428/152
See application file for complete search history.

(56) References Cited

U.S. PATENT DOCUMENTS

| | | | |
|---|---|---|---|
| 9,773,389 B2 | 9/2017 | Do et al. | |
| 10,049,539 B2 * | 8/2018 | Do | ............................ F16F 6/00 |
| 2006/0044271 A1 | 3/2006 | Anastas | |
| 2007/0211032 A1 | 9/2007 | Ahn et al. | |
| 2009/0039309 A1 | 2/2009 | Bose et al. | |
| 2012/0062371 A1 | 3/2012 | Radivojevic et al. | |
| 2016/0239086 A1 | 8/2016 | Do et al. | |

FOREIGN PATENT DOCUMENTS

| | | |
|---|---|---|
| KR | 100968904 | 7/2010 |
| KR | 1020130060998 | 6/2013 |

* cited by examiner

FIG. 2
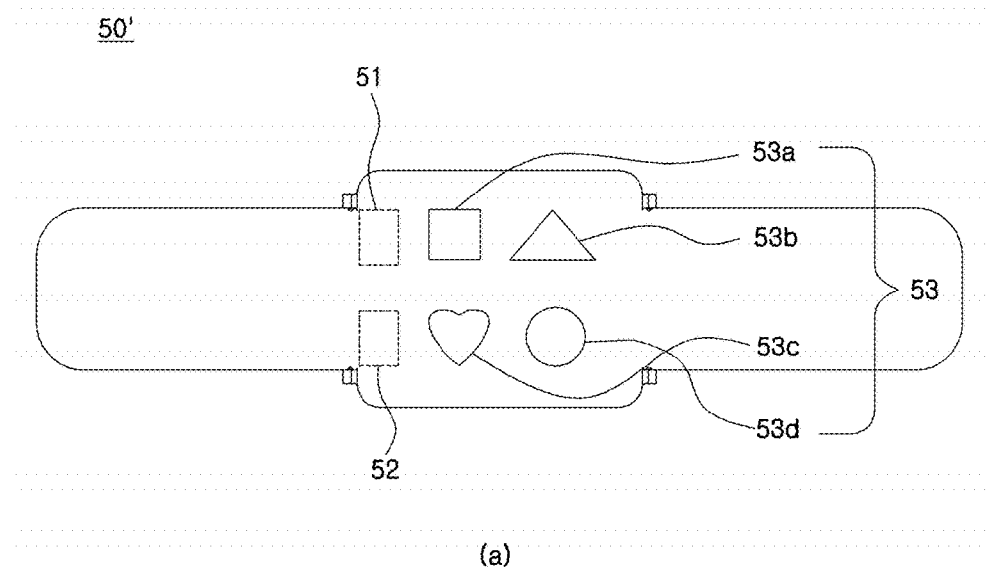
(a)
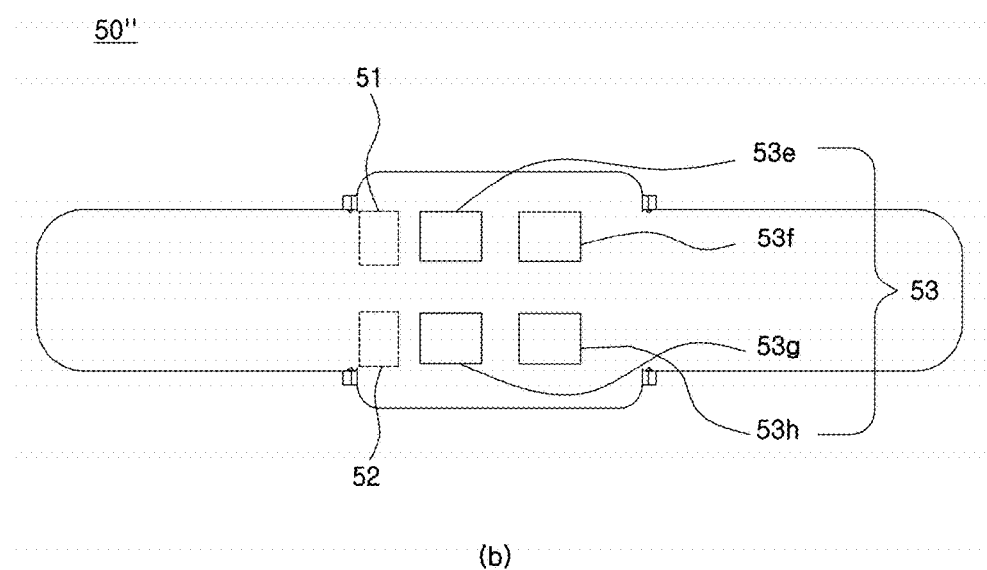
(b)

FIG. 5
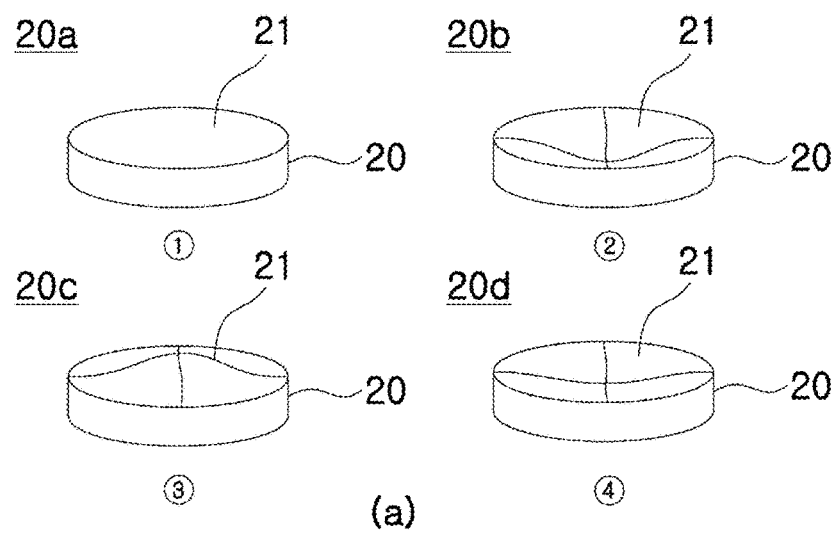
(a)
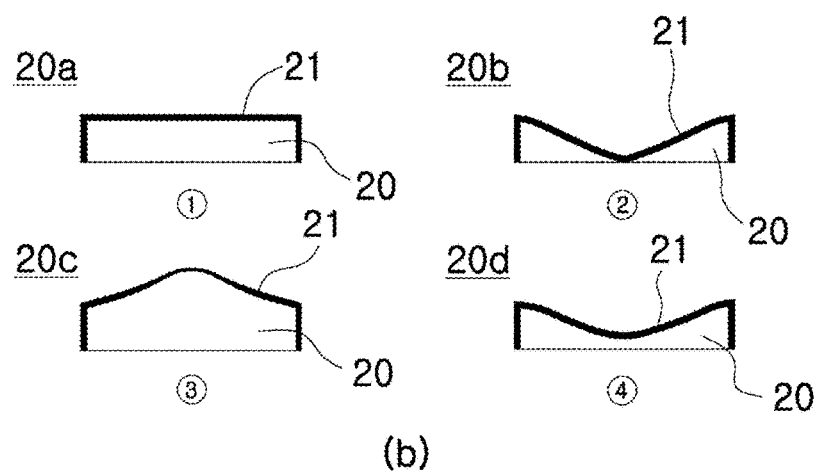
(b)

(a)

(b)

FIG. 10
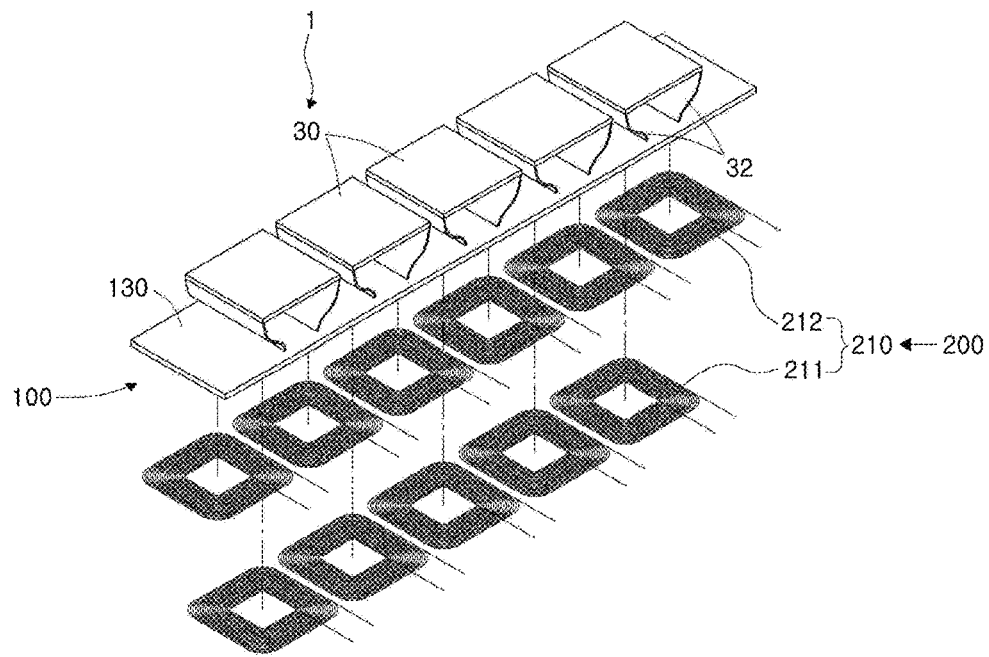
(a)
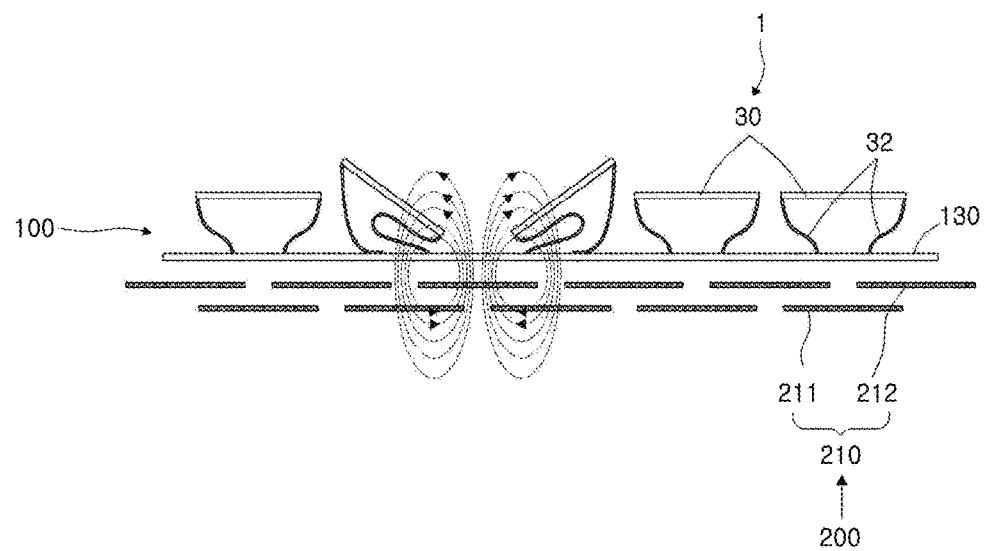
(b)

FIG. 11
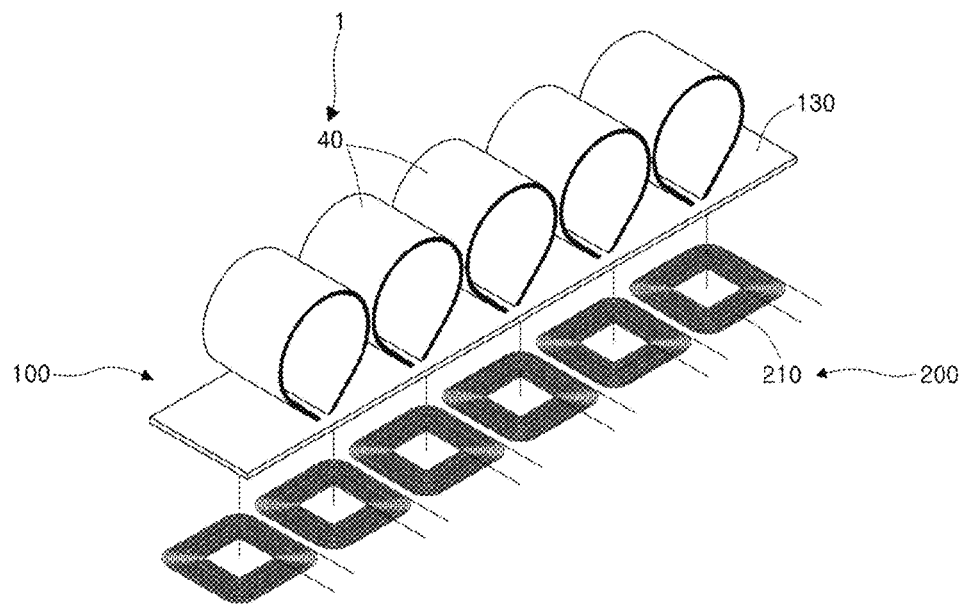
(a)
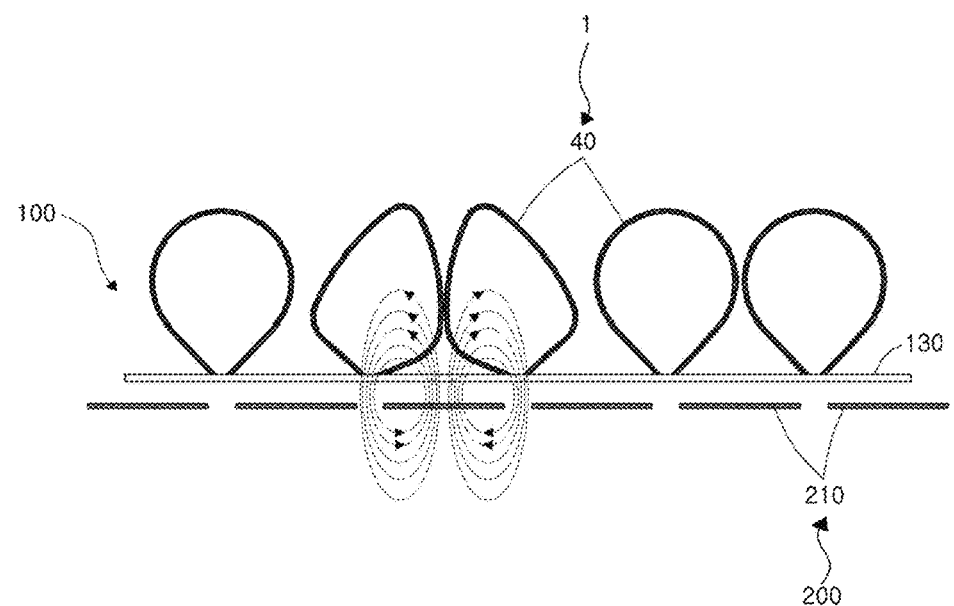
(b)

| Time Line | Off State | On state |
|---|---|---|
| RECEIVE EXTERNAL SIGNAL | | |
| APPLY CONTROL SIGNAL | | ALL UNIT CELLS |
| SEQUENTIALLY APPLY/ REMOVE ELECTRICAL SIGNALS TO/ FROM UNIT CELLS | A2 | |
| | A3 | A2 |
| | A4 | A3 |
| | A3 | A4 |
| | A2 | A3 |
| | B2 | A2 |
| | C2 | B2 |
| | C3 | C2 |
| | C4 | C3 |
| | C3 | C4 |
| | D3 | C3 |
| | E3 | D3 |
| | E2 | E3 |
| | E3 | E2 |
| | E4 | E3 |
| | | E4 |
| STOP | ALL UNIT CELLS | |

TACTILE INFORMATION SUPPLY MODULE

TECHNICAL FIELD

The present invention relates to a tactile information supply module and, more particularly, to a tactile information supply module for converting message information received from the outside, into a tactile signal and providing tactile information using a variation in shape of at least one tactile sensation provider comprising magnetic particles and a matrix material, in response to an externally applied magnetic field.

BACKGROUND ART

Haptics refer to a technology about tactile sensation and, more particularly, to a technology for allowing a user of an electronic device to feel touch, forces, motion, etc. through a keyboard, a mouse, a joystick, a touchscreen, or the like. Although visual information accounted for most of the information exchanges between electronic devices and people in the past, the haptic technology currently attracts attention with regard to providing more detailed and realistic information.

In general, an inertial actuator, a piezoelectric actuator, an electroactive polymer (EAP) actuator, an electrostatic actuator, etc. are used for the haptic technology. Examples of the inertial actuator include an eccentric motor that vibrates by an eccentric force generated by the rotation of the motor, and a linear resonant actuator (LRA) that maximizes the vibrational intensity by resonant frequencies. The piezoelectric actuator is in the shape of a beam or a disk and is driven by a piezoelectric element whose size or shape changes instantaneously in response to an electric field. The EAP actuator generates vibration by repeated movements of a mass attached to an EAP film. The electrostatic actuator is driven by an attractive force generated between two oppositely charged glass sheets and a repulsive force generated when the glass sheets have charges with the same polarity.

However, the above-described conventional haptic technology is merely used to provide simple vibration, and therefore has limitations for providing emotional tactile sensation or complicated text information. Accordingly, research needs to be conducted on a tactile supply structure capable of effectively providing emotion and complicated information as well as simply providing vibration.

DETAILED DESCRIPTION OF THE INVENTION

Technical Problem

The present invention provides a tactile information supply module capable of emotionally providing various types of tactile information.

The present invention also provides a tactile information supply module capable of effectively providing not only a simple signal received from an external device, such as an alarm, but also complicated information, such as texts or geometric figures as tactile information using a tactile unit configured in the form of at least one cell.

Technical Solution

According to an aspect of the present invention, there is provided a tactile information supply module including a receiver for receiving message information from the outside, a controller for converting the message information into a tactile signal, and an operator for providing a user with tactile information according to the tactile signal, wherein the operator includes at least one tactile sensation provider comprising magnetic particles and a matrix material, and wherein the tactile sensation provider is transformed in response to an external magnetic field to provide the tactile information.

Advantageous Effects

According to the present invention, various types of tactile information may be provided emotionally.

Furthermore, not only a simple signal received from an external device, such as an alarm, but also complicated information, such as texts or geometric figures may be effectively provided as tactile information using a tactile unit configured in the form of at least one cell.

DESCRIPTION OF THE DRAWINGS

FIG. 2 illustrates tactile information supply modules according to other embodiments of the present invention.

FIG. 5 illustrates the process of providing a tactile sensation by a tactile sensation provider in response to an external magnetic field, according to another embodiment of the present invention.

FIGS. 9 to 11 include perspective views and side elevational views of tactile sensation providers and operators according to other embodiments of the present invention.

FIGS. 13 to 15 illustrate the operation processes of an operator, according to other embodiments of the present invention.

EXPLANATION OF REFERENCE NUMERALS

Figure 1:
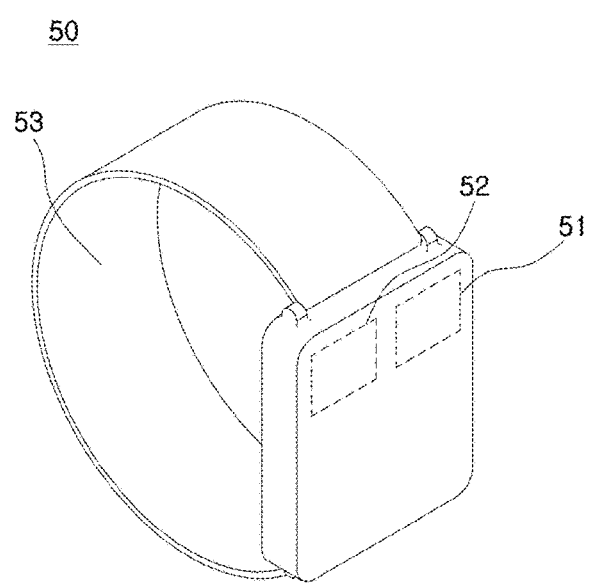
FIG. 1 illustrates a tactile information supply module according to an embodiment of the present invention.

1, 10, 20, 30, 40: Tactile sensation providers
50: Tactile information supply module
51: Receiver
52: Controller
53: Operator
60: Wearable device
100: Tactile unit
110: Cells
200: Magnetic field generator
210: Coil units

MODE OF THE INVENTION

The accompanying drawings, which show embodiments for illustrative purposes only, will be referred to. The embodiments will be described in sufficient detail for one of ordinary skill in the art to understand the present invention. It should be understood that various embodiments of the present invention may differ from each other but need not be mutually exclusive. For example, particular shapes, structures and characteristics disclosed herein may be embodied in other embodiments without departing from the spirit and scope of the present invention. Furthermore, the position or arrangement of individual elements in each embodiment disclosed herein may change without departing from the spirit and scope of the present invention. Accordingly, the following detailed description is not intended to be restrictive, and the scope of the present invention is determined only by the accompanying claims along with equivalents of what is claimed by the claims, if properly explained. In the drawings, like reference numerals denote like elements and lengths, areas, thicknesses or shapes may be exaggerated for the sake of convenience.

The following description is given of embodiments of the present invention with reference to the attached drawings in such a manner that the present invention can be easily carried out by one of ordinary skill in the art.

FIG. 1 illustrates a tactile information supply module 50 according to an embodiment of the present invention.

Referring to FIG. 1, the tactile information supply module 50 of the present invention may include a receiver 51, a controller 52, and an operator 53. The tactile information supply module 50 may be used independently or attached to other devices, e.g., mobile devices such as a smartphones, wearable devices such as smart watches, or bracelets.

The receiver 51 may receive message information from the outside, and may use any known data receiving device. The message information should be understood to include not only image information such as texts, geometric figures, or symbol but also other information such as simple warnings, alarms, or notice, which can be transferred over a wired/wireless communication network.

The controller 52 may convert the message information the receiver 51 received, into a tactile signal. The tactile signal is a control signal capable of controlling each component of the operator 53, and should be understood to be a control signal for applying/removing a magnetic field to each of the plurality of cells 110 of a tactile unit 100, which will be described below.

The operator 53 may provide a user with tactile information based on the tactile signal of the controller 52. Here, the tactile information should be understood to include not only tactile sensations such as vibration, brushing, constriction, beating, pressing, tapping, tilting, or tickling but also emotions, feelings, etc. transferred via tactile sensations (e.g., transferring the emotion of "love" via a tactile sensation generated by the shape of "♡" or the feeling of "sadness" via a tactile sensation generated by the shape of "T_T").

The operator 53 may be provided on the surface of the tactile information supply module 50 to directly provide tactile information to a user, or may be provided within the tactile information supply module 50 to indirectly provide tactile information such as vibration or tapping to the user. FIG. 1 shows that the operator 53 has the shape of a watch which can be worn on the wrist of a user such that tactile information can be provided through the inner circumferential surface of the watch band that contacts the user. Of course, the operator 53 may be provided on the whole or part of the inner circumferential surface of the watch band. Besides, the shape of the operator 53 is not restricted as long as it is within the object of at least part of the operator 53 contacting a user and providing tactile information for the user. For example, the tactile information supply module 50 may be in the shape of a bracelet, a ring, an accessory, or clothing as well as a band such that tactile information is provided from the part that contacts a user.

FIG. 2 illustrates tactile information supply modules 50' and 50" according to other embodiments of the present invention.

Referring to FIG. 2, the tactile information supply module 50' may include a plurality of operators 53: 53a to 53d or 53e to 53h. Each of the operators 53a to 53d or 53e to 53h may be provided at different locations. For example, in the tactile information supply module 50' in the form of a band worn on the wrist, one operator 53 may contact the upper part of the wrist, the other operator 53 may contact the lower part of the wrist, and another operator 53 may contact a side of the wrist, thereby providing tactile information.

In addition, the operators 53a to 53d or 53e to 53h may provide different types of tactile information (e.g., vibration, brushing, constriction, beating, pressing, tapping, tilting, tickling, etc.).

In the tactile information supply module 50' in (a) of FIG. 2 according to an embodiment, the operators 53a to 53d may have different shapes (e.g., a rectangle, a triangle, a circle, etc.) and provide various types of tactile information.

In the tactile information supply module 50" illustrated in (b) of FIG. 2 according to another embodiment, each of the operators 53e to 53h may operate to respond to a person or a group who sent message information. For example, the operators 53e is made to correspond to the father, the operator 53f to the mother, the operator 53g to the lover, and the operator 53h to a friend such that, when a person or a group sends message information, only the corresponding operator 53e, 53f, 53g or 53h may provide tactile information.

Furthermore, the operator 53e may be configured to provide tactile information when phone calls are coming, the operator 53f may be configured to provide tactile information when text messages are received, the operator 53g may be configured to provide tactile information when an emails are received, and the operator 53h may be configured to provide tactile information to let a user know the alarm time. In addition, each of the operators 53: 53a to 53d or 53e to 53h may be variously configured to correspond to particular functions.

Meanwhile, when the tactile information supply module 50 is used independently, i.e. without being attached to wearable devices, mobile devices, or the like, the tactile information supply module 50 may further include a power supply (not shown) that supplies electric power to the receiver 51, the controller 52, and the operator 53.

Hereinafter, a detailed description will be given of the way the tactile information supply module 50 of the present invention provides tactile information.

Figure 3:
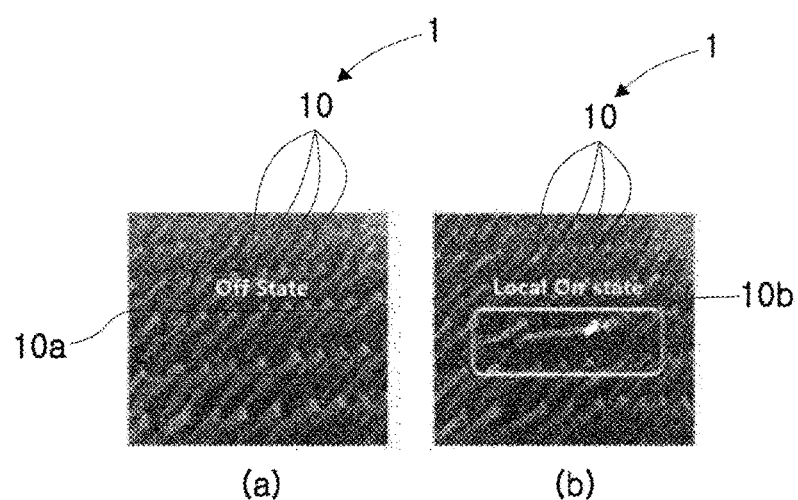
FIG. 3 illustrates the change of the shape of a tactile sensation provider in response to an external magnetic field, according to an embodiment of the present invention.

FIG. 3 illustrates the change of the shape of a tactile sensation provider in response to an external magnetic field, according to an embodiment of the present invention.

Referring to FIG. 3, the tactile sensation provider 1 may include magnetic particles, e.g., nano- or micro-scale iron (Fe), cobalt (Co), nickel (Ni), or ferrite particles, and a matrix material, e.g., rubber or a polymeric material.

Alternatively, the tactile sensation provider 1 may be in the shape of at least one of fine projections 10 (see FIG. 4), empty cylinders 20 (see FIG. 5), polyhedrons, domes, plates 30 (see FIG. 9), leaf springs, seesaws (see FIG. 10), and tunnels 40 (see FIG. 11).

For example, to supply tactile information, the tactile sensation providers 1 may include a magnetorheological elastomer (MRE). The MRE is an elastomer material including particles that are capable of responding to an external magnetic field. Since the elastomer material includes magnetic particles such as iron (Fe) that are capable of being magnetized in response to an external magnetic field, the characteristics of the MRE, e.g., stiffness, tensile strength, and elongation rate, may be changed by the application of the external magnetic field.

The tactile sensation providers 1 may have different shapes in response to the influence of an external magnetic field.

Referring to (a) of FIG. 3, when a plurality of tactile sensation providers 1 is not influenced by an external magnetic field (Off State), in other words, when a magnetic field is not generated by a coil unit 210 (see FIG. 7), which is described below, of the magnetic field generator 200, the plurality of tactile sensation providers 1 may have a first shape 10*a* or 20*a* (See FIGS. 4 and 5).

Referring to (b) of FIG. 3, when part of the plurality of tactile sensation providers 1 is influenced by an external magnetic field (Local On State), in other words, when a magnetic field is generated by the coil unit 210 (see FIG. 7), which is described below, of the magnetic field generator 200, the part of the plurality of tactile sensation providers 1 may have a second shape 10*b* or 20*b* (See FIGS. 4 and 5).

Figure 4:
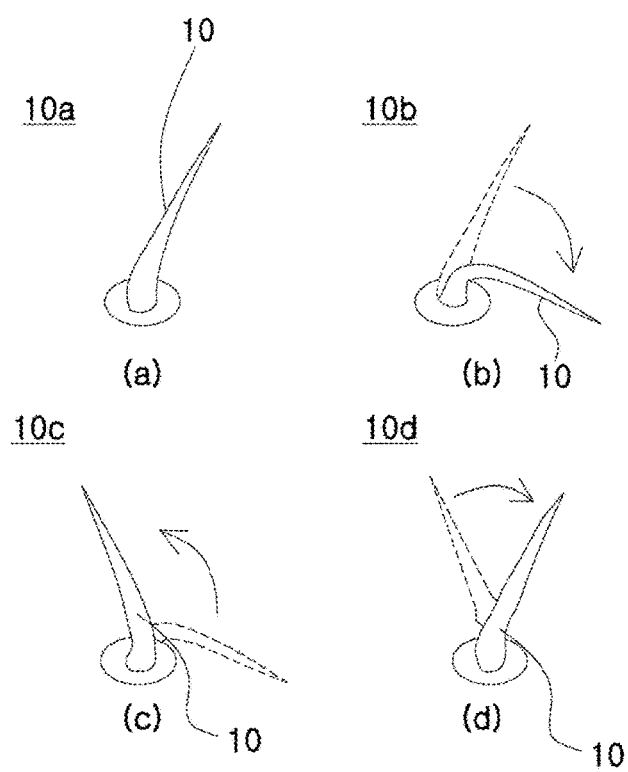
FIG. 4 illustrates the process of providing a tactile sensation by a tactile sensation provider in response to an external magnetic field, according to an embodiment of the present invention.
Figure 6:
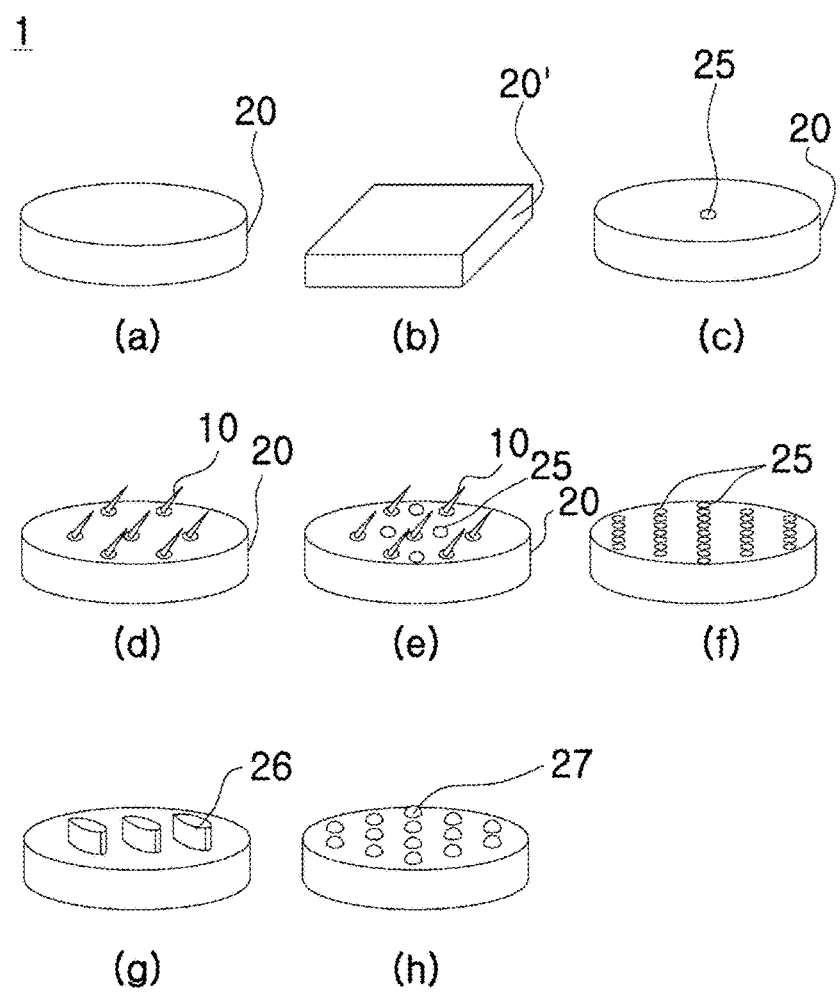
FIG. 6 illustrates various shapes of tactile sensation providers, according to various embodiments of the present invention.

FIG. 4 illustrates the process of providing tactile information by a tactile sensation provider 1 in response to an external magnetic field, according to an embodiment of the present invention, FIG. 5 illustrates the process of providing a tactile information by a tactile sensation provider 1 in response to an external magnetic field, according to another embodiment of the present invention, and FIG. 6 illustrates various shapes of a tactile sensation provider, according to embodiments of the present invention.

Referring to FIG. 4, the tactile sensation provider 1 may be in the shape of a fine projection 10. The thickness of the fine projection 10 may be equal to or smaller than about 25 µm, similar to the fleece of a sheep, or may be equal to or smaller than about 100 µm, similar to human hair, to provide tactile information precisely and emotionally As shown in (a) of FIG. 4, when not influenced by an external magnetic field, the fine projection 10 may remain slightly inclined (or the first shape 10*a*). Alternatively, the fine projection 10 may remain straight and vertical without inclination. Then, as shown in (b) of FIG. 4, when influenced by an external magnetic field, the fine projection 10 may remain further inclined or even horizontal (or the second shape 10*b*). Then, as shown in (c) and (d) of FIG. 4, when not affected by the external magnetic field after the application of the magnetic field is ceased, the fine projection 10 may return from the second shape 10*b* to the first shape 10*a* and produce a reciprocating motion 10*c* and 10*d* by its own elastic force (or restoring force). Accordingly, a tactile information similar to brushing or tickling may be transferred by the fine projection 10*c* and 10*d* moving in the reciprocating motion.

Referring to FIG. 5, the tactile sensation provider 1 may be in the shape of an empty cylinder 20, a dome or a polyhedron 20' (see (b) of FIG. 6). (a) of FIG. 5 is a perspective view of the tactile sensation provider 1 in the shape of the cylinder 20, and (b) of FIG. 5 is a vertical cross-sectional view of the tactile sensation provider 1 in the shape of the cylinder 20.

When not influenced by an external magnetic field, the empty cylinder 20 may have a top surface 21, which is flat (or a first shape 20*a*) as indicated by ①. Then, when influenced by an external magnetic field, the top surface 21 of the cylinder 20 may subside into the empty internal space (or a second shape 20*b*) as indicated by ②. Then, when not affected by the external magnetic field after the application of the magnetic field is ceased, the cylinder 20 may return from the second shape 20*b* to the first shape 20*a* and produce a reciprocating motion 20*c* and 20*d* by its own elastic force (or restoring force), as indicated by ③ and ④. Accordingly, a tactile information similar to tapping may be transferred by the cylinder 20*c* and 20*d* moving in the reciprocating motion.

Figure 7:
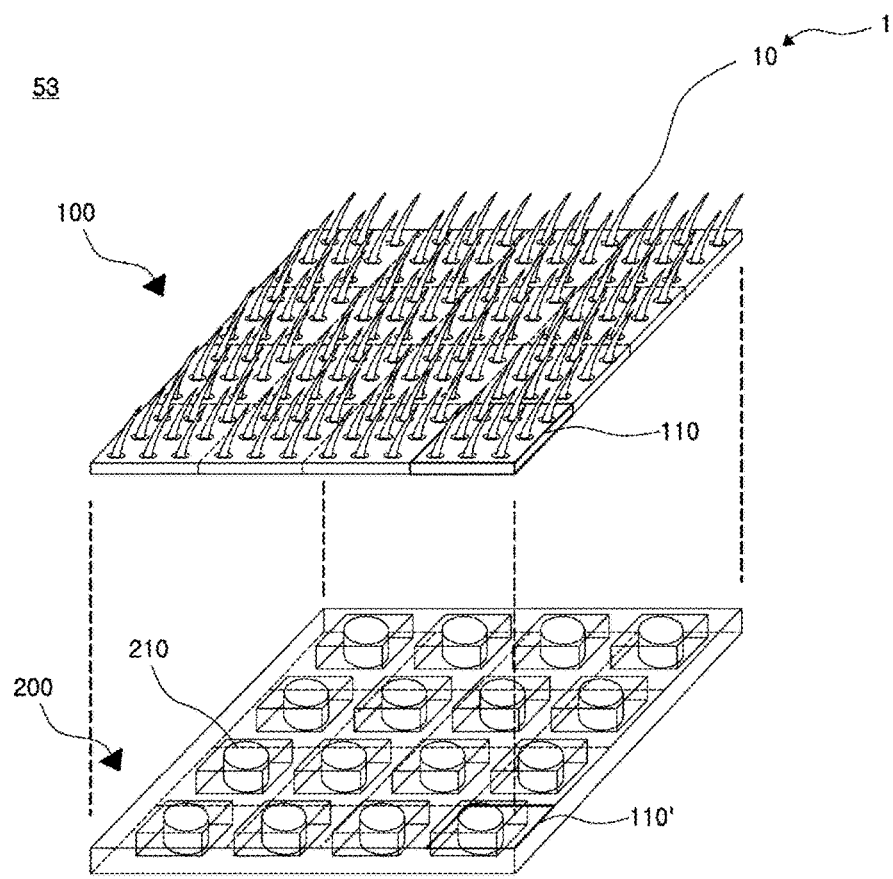
FIG. 7 is an exploded perspective view of an operator according to an embodiment of the present invention.

At least one of the degree (amount), direction, and frequency of the transformation from the first shape 10*a* or 20*a* to the second shape 10*b* or 20*b* of the tactile sensation provider 1 can be controlled by controlling at least one of the intensity, direction and frequency of a magnetic/electric field generated by the magnetic field generator 200 (See FIG. 7). For example, if a stronger magnetic field is applied, the fine projections 10 will be inclined more or the top surface 21 of the cylinder 20 will subside more, thereby transferring stronger tactile information. Furthermore, if the frequency of the magnetic field is changed, the speed of transformation of the fine projections 10 or the cylinder 20 from the first shape 10*a* or 20*a* to the second shape 10*b* or 20*b* and then back to the first shape 10*a* or 20*a* also changes, thereby transferring various types of tactile information.

Referring to FIG. 6, the tactile sensation provider 1 may have various shapes other than the fine projection 10, the empty cylinder 20, a dome and the polyhedron 20'.

(1) (a) of FIG. 6 shows the empty cylinder 20, (2) (b) of FIG. 6 shows an empty hexahedron 20' (or polyhedron 20'), (3) (c) of FIG. 6 shows the empty cylinder 20 with a top surface wherein micro-holes 25 are provided, capable of increasing the durability of the tactile sensation provider 1 by allowing air to smoothly enter and exit through the micro-holes 25 while the top surface moves in the reciprocating motion 20*c* and 20*d*, (4) (d) of FIG. 6 shows a combined shape of the fine projections 10 and the empty cylinder 20, (5) (e) of FIG. 6 shows a shape identical to the shape of (d) of FIG. 7, except that a plurality of micro-holes 25 are provided in the top surface of the cylinder 20, (6) (f) of FIG. 6 shows a shape identical to the shape of (c) of FIG. D, except that a plurality of micro-holes 25 are provided, (7) (g) of FIG. 6 shows the empty cylinder 20 with a top surface wherein various structures 26 (e.g., empty cylinders smaller than the cylinder 20) are combined, and (8) (h) of FIG. 6 shows the empty cylinder 20 with a top surface wherein dome-shaped embossed structures 27 are provided.

As described above, according to the present invention, various types of tactile information such as brushing, tickling, tapping, etc. may be transferred in multiple ways by configuring the tactile sensation provider 1 in various shapes.

Figure 8:
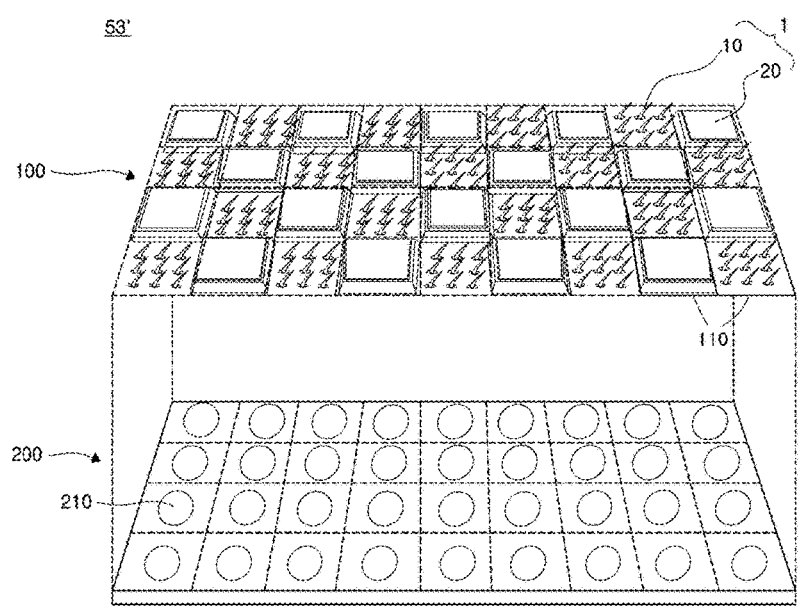
FIG. 8 is an exploded perspective view of a tactile unit including a plurality of cells, according to an embodiment of the present invention.

FIG. 7 is an exploded perspective view of the operator 53 according to an embodiment of the present invention, and FIG. 8 is a perspective view of a tactile unit 100 including a plurality of cells 110, according to an embodiment of the present invention.

Referring to FIG. 7, the operator 53 according to an embodiment of the present invention includes the tactile unit 100 and the magnetic field generator 200 and the tactile unit 100 includes at least one tactile sensation provider 1.

The tactile unit 100 is the part that actually contacts the user of the tactile information supply module and transfer tactile information. The tactile unit 100 may include at least one cell 110. The size of the cell 110 may be appropriately determined in consideration of the size of the tactile unit 100, the resolution of tactile information to be transferred, etc.

The cell 110 may include at least one tactile sensation provider 1. The cell 110 may include one or more types of the tactile sensation provider 1. Furthermore, like the operator 53' shown in FIG. 8, each cell 110 may include various types of the tactile sensation providers 1, e.g., the fine projections 10, the empty cylinders 20, etc.

The magnetic field generator 200 may generate a magnetic field and include at least one coil unit 210. It is preferable that the magnetic field generator 200 is provided under the tactile unit 100 and each coil unit 210 (or each cell 110' including the coil unit 210) corresponds to each cell 110 of the tactile unit 100. However, the magnetic field generator 200 may be provided at locations other than under the tactile unit 100 as long as it is within a range in which each coil unit 210 can apply a magnetic field to its corresponding cell 110.

When a magnetic field is generated by one coil unit 210, at least one tactile sensation provider 1 provided on the cell 110 that corresponds to the coil unit 210 may be transformed from the first shape 10a to the second shape 10b. When the magnetic field generated by the coil unit 210 is dissipated, the tactile sensation provider 1 on the cell 110 corresponding to the coil unit 210 return from the second shape 10b to the first shape 10a.

Figure 9:
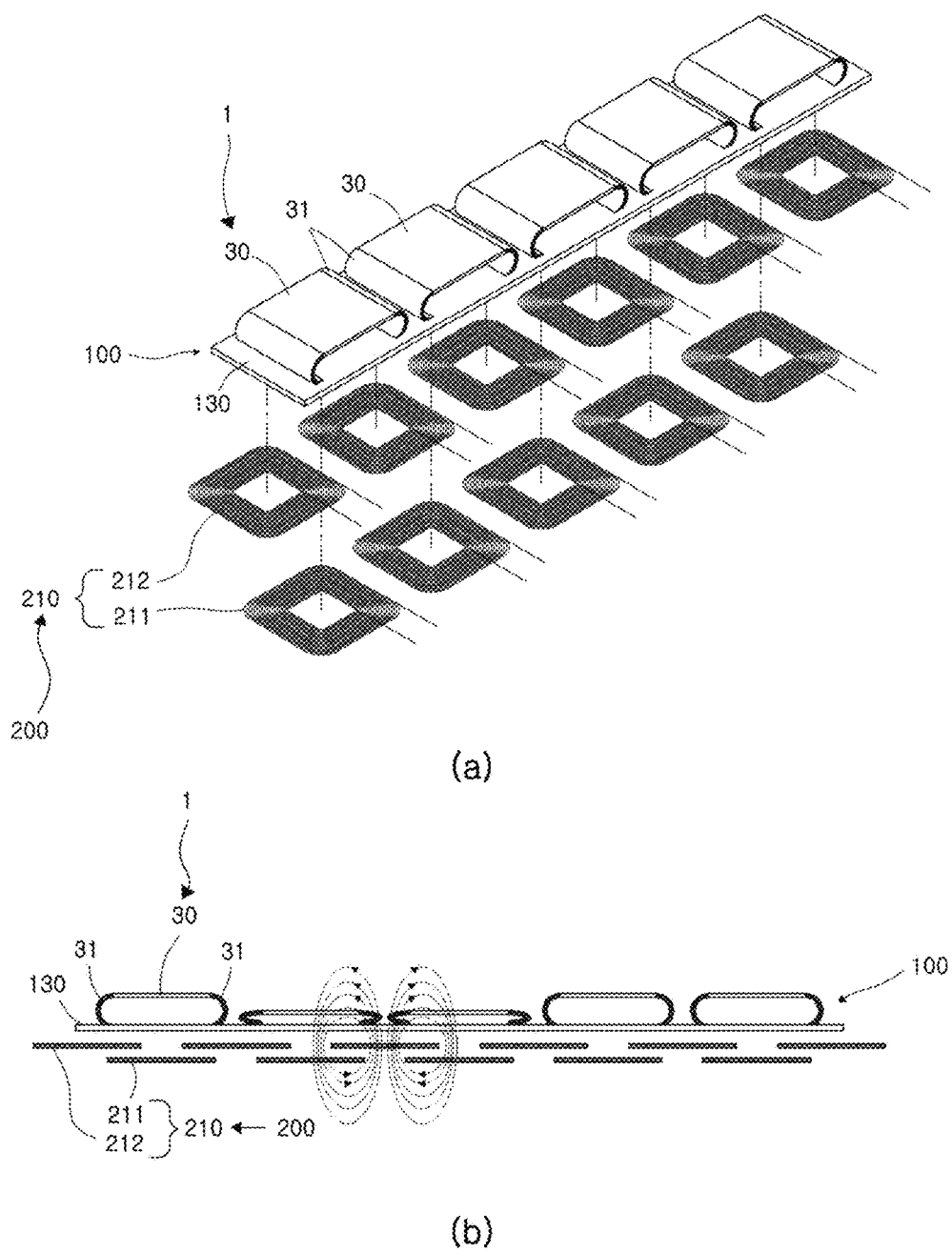

FIGS. 9 to 11 include perspective views and side elevational views of tactile sensation providers and operators according to other embodiments of the present invention.

Referring to FIG. 9, the tactile unit 100 may include plate-shaped tactile sensation providers 1: 30 and supporters 31 formed integrally with the tactile sensation providers 30 on each side of the tactile sensation providers 30 and having a curved shape. Alternatively, referring to FIG. 10, the tactile unit 100 may include plate-shaped tactile sensation providers 1: 30 and supporters 32 formed integrally with the tactile sensation providers 30 on each side of the tactile sensation providers 30 and having a wave shape.

Herein, the supporters 31 and 32 may be understood as components provided between the tactile sensation providers 1: 30 and the magnetic field generator 200 to ensure operating space for the tactile sensation providers 1. The supporters 31 and 32 may be MREs.

A plurality of tactile sensation providers 1 and supporters 31 and 32 may define at least one cell, and a plurality of cells may be disposed on an insulator 130 at equal distances from each other. The coil units 210 of the magnetic field generator 200 may be provided as a single layer or multiple layers 211 and 212.

Referring to (b) of FIG. 9, the tactile sensation providers 1 and the supporters 31 may move up and down and produce a reciprocating motion involving a change in shape (first and second shapes) in response to a magnetic field generated by the magnetic field generator 200. The change in shape may cause the movement of one or all the cells, thereby transferring tactile sensations such as tapping to a user. Here, the tactile sensation provider 1 may be in the shape of a plurality of laminated leaf spring rather than the plate shape.

Referring to (b) of FIG. 10, in response to a magnetic field generated by the magnetic field generator 200, the supporters 32 made of an MRE may be transformed and, like a seesaw, one end of the tactile sensation provider 1 may tilt toward the center of the magnetic field generator 200 (a second shape). When no magnetic field is generated by the magnetic field generator 200, the supporters 32 may return to the original shape (a first shape) by their own elastic force. That is, by applying a magnetic field to one or all the cells, various types of tactile sensations such as vibration, beating, tapping, and tilting may be transferred to a user.

Referring to FIG. 11, the tactile unit 100 includes tactile sensation providers 1: 40 having a tunnel shape and internal oval spaces. When a magnetic field is generated by the magnetic field generator 200, the tactile sensation providers 1 made of an MRE may be transformed and one end of the tactile sensation provider 1 may move toward the center of the magnetic field generator 200 (a second shape). When no magnetic field is generated by the magnetic field generator 200, the tactile sensation providers 1 may return to the original shape (a first shape) by their own elastic force. That is, by applying a magnetic field to one or all the cells, various types of tactile sensations such as pinching and constriction may be transferred to a user.

Figure 12:
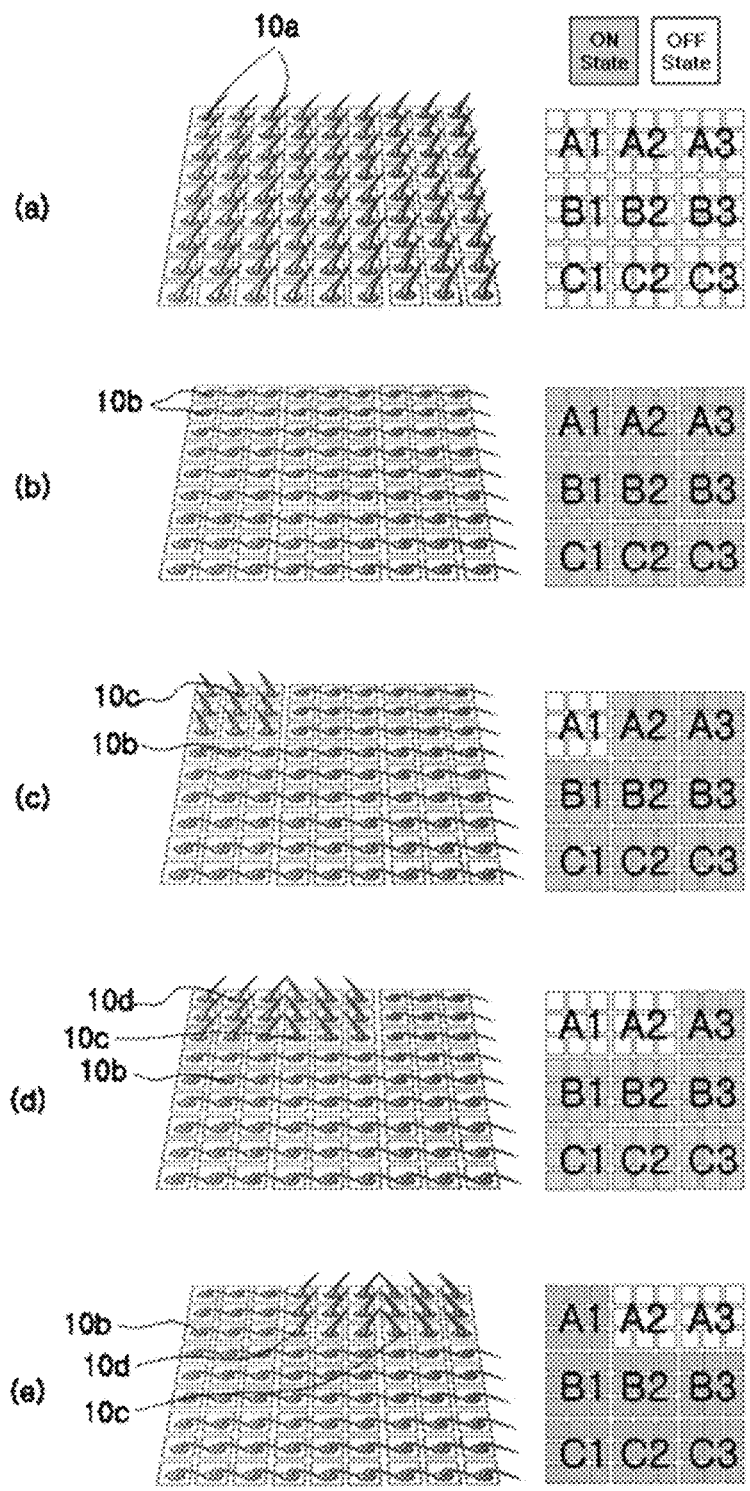
FIG. 12 illustrates the operation process of an operator, according to an embodiment of the present invention.

FIG. 12 illustrates the operation process of the operator 53, according to an embodiment of the present invention.

Referring to (a) of FIG. 12, magnetic fields are not yet applied to cells A1 to C3 on the tactile unit 100. Accordingly, all the fine projections 10 on the tactile unit 100 may maintain the first shape 10a.

Then, referring to (b) of FIG. 12, magnetic fields are applied to cells A1 to C3 on the tactile unit 100 and therefore all the fine projections 10 on the tactile unit 100 may maintain the second shape 10b.

Referring to (c) of FIG. 12, when only the magnetic field applied by the coil unit 210 positioned corresponding to cell A1 is ceased, only the fine projections 10 on cell A1 may return to the first shape 10a and produce the reciprocating motion 10c and 10d by their own elastic force (or restoring force).

Referring to (d) of FIG. 12, when the magnetic field applied by the coil unit 210 positioned corresponding to cell A2 is ceased, only the fine projections 10 on cell A2 may return to the first shape 10a and produce the reciprocating motion 10c and 10d by their own elastic force (or restoring force). The reciprocating motion of the fine projections 10 on cell A1 may be weakened compared to that of the fine projections 10 on cell A2.

Referring to (e) of FIG. 12, when the magnetic field applied by the coil unit 210 positioned corresponding to cell A3 is also released, only the fine projections 10 on cell A3 may return to the first shape 10a and produce the reciprocating motion 10c and 10d by their own elastic force (or restoring force). The reciprocating motion of the fine projections 10 on cell A2 may be weakened compared to that of the fine projections 10 on cell A3. At the same time, a magnetic field may be applied again by the coil unit 210 positioned corresponding to cell A1 such that the fine projections 10 on cell A1 may maintain the second shape 10b.

If the application of magnetic fields are sequentially done and ceased to cells A1 and C3 as described above, the fine projections 10 on cells A1 to C3 may be transformed from the first shape 10a to the second shape 10b and then produce the reciprocating motion 10c and 10d while returning from the second shape 10b to the first shape 10a, thereby providing the user of the tactile information supply module with tactile information that is transferred sequentially from cell A1 to cell C3.

Figure 13:
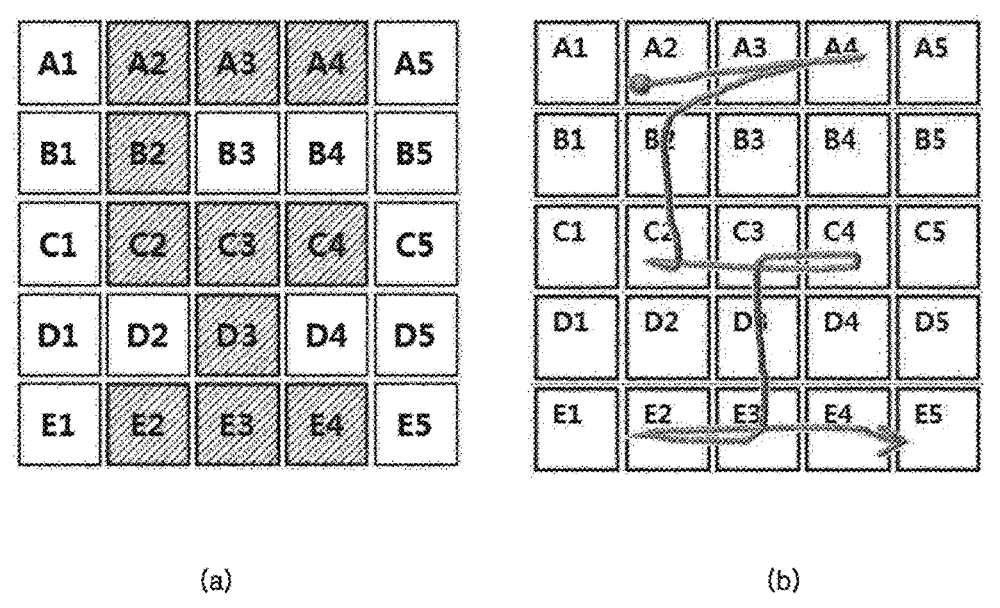
Figure 15:
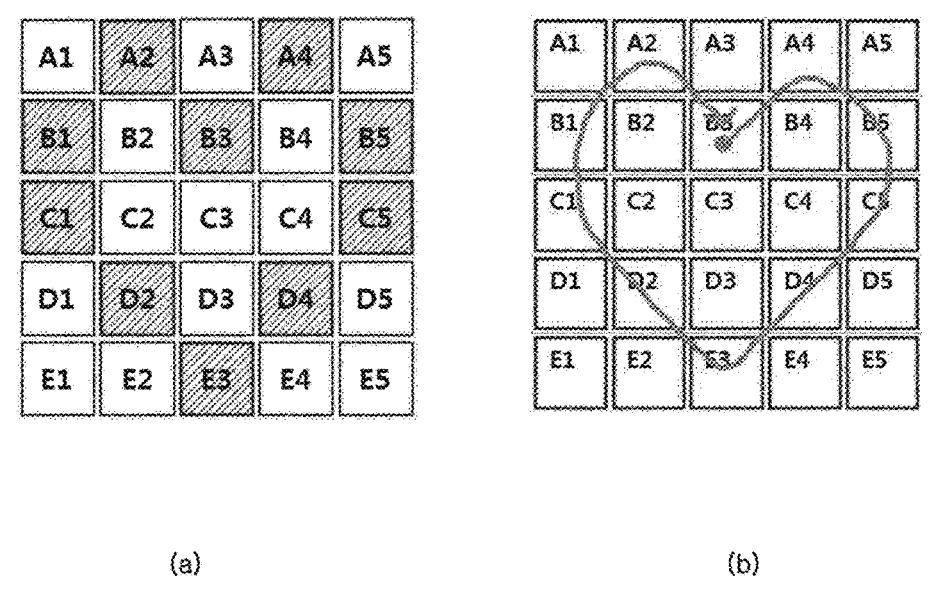

FIGS. 13 to 15 illustrate the operation processes of the operator 53, according to other embodiments of the present invention. FIGS. 13 and 14 illustrate the operation process of the controller 52 and the operator 53 to provide the Korean character "ㄴ" as tactile information, and FIG. 15 illustrates the operation process of the controller 52 and the operator 53 to provide the symbol "♡" as tactile information.

The tactile information supply module 50 of the present invention may convert message information (text type information) received from the outside, into tactile information and then provide the tactile information. The following description assumes that the tactile unit 100 includes a plurality of cells 110, i.e. cell A1 to cell E5, in a 5×5 matrix.

Referring to FIGS. 13 and 14, when the receiver 51 receives message information in the form of the Korean character "도" from the outside, the controller 52 may convert the message information into a tactile signal (or a control signal). The tactile signal is a signal for controlling the plurality of cells 110 of the tactile unit 100. The tactile signal that corresponds to the Korean character "도" is a signal for controlling cells A2, A3, A4, B2, C2, C3, C4, D3, E2, E3, and E4 (see (a) of FIG. 13).

The controller 52 may control the coil units 210 that correspond to cells A2, A3, A4, B2, C2, C3, C4, D3, E2, E3, and E4 to simultaneously apply/remove a magnetic field such that the tactile sensation providers 1 on cells A2, A3, A4, B2, C2, C3, C4, D3, E2, E3, and E4 are simultaneously transformed and produce the reciprocating motion 10a to 10d or 20a to 20d. Therefore, the tactile information supply module 50 may provide the user with the Korean character "도" as tactile information in a similar manner to braille.

Alternatively, as illustrated in (b) of FIG. 13 and FIG. 14, if magnetic fields are sequentially applied to and then removed from cells A2→A3→A4→A3→A2→B2→C2→C3→C4→C3→D3→E3→E2→E3→E4, the tactile sensation providers 1 on the cells may be sequentially transformed from the first shape 10a or 20a to the second shape 10b or 20b and then to the first shape 10a or 20a to produce the reciprocating motion 10c and 10d or 20c and 20d, such that the Korean character "도" may be provided to the user of the tactile information supply module 50 as tactile information in a similar manner to handwriting.

Furthermore, the tactile information supply module 50 of the present invention may convert message information (symbol type information) received from the outside, into tactile information and then provide the tactile information. The following description assumes that the tactile unit 100 includes a plurality of cells 110, i.e. cell A1 to cell E5, in a 5×5 matrix.

Referring to FIG. 15, the receiver 51 may receive message information in the form of the symbol "♡" from the outside. The sender may send the message information of "♡" by directly inputting the symbol "♡" or inputting the words that can suggest the symbol "♡", e.g., "heart" or "love". The controller 52 may convert the message information into a tactile signal (or a control signal), which corresponds to the symbol "♡". The tactile signal corresponding to the symbol "♡" is a signal for controlling cells A2, A4, B1, B3, B5, 01, C5, D2, D4, and E3 (see (a) of FIG. 15). In other words, even when the sender does not directly input the symbol "♡", if the message information is "heart" or "love" preregistered in the controller 52, the controller 52 may convert the message information into a tactile signal (or a control signal), which corresponds to the symbol "♡" and then provide tactile information.

The controller 52 may control the coil units 210 that correspond to cells A2, A4, B1, B3, B5, 01, C5, D2, D4, and E3 to simultaneously apply/remove a magnetic field such that the tactile sensation providers 1 on cells A2, A4, B1, B3, B5, 01, C5, D2, D4, and E3 are simultaneously transformed and produce the reciprocating motion 10a to 10d or 20a to 20d. Therefore, the tactile information supply module 50 may provide the user with the symbol "♡" as tactile information in a similar manner to braille.

Alternatively, as illustrated in (b) of FIG. 15, if magnetic fields are sequentially applied to and then removed from cells B3→A2→B5→C5→D4→E3→D2→C1→B1→A2, the tactile sensation providers 1 on the cells may be sequentially transformed from the first shape 10a or 20a to the second shape 10b or 20b and then back to the first shape 10a or 20a to produce the reciprocating motion 10c and 10d or 20c and 20d, such that the symbol "♡" may be provided to the user of the tactile information supply module 50 as tactile information in a similar manner to handwriting.

Furthermore, in association with independent applications, shapes drawn with a pen in real time may be received as message information and then provided as tactile information, thereby providing more complicated tactile information effectively.

Figure 16:
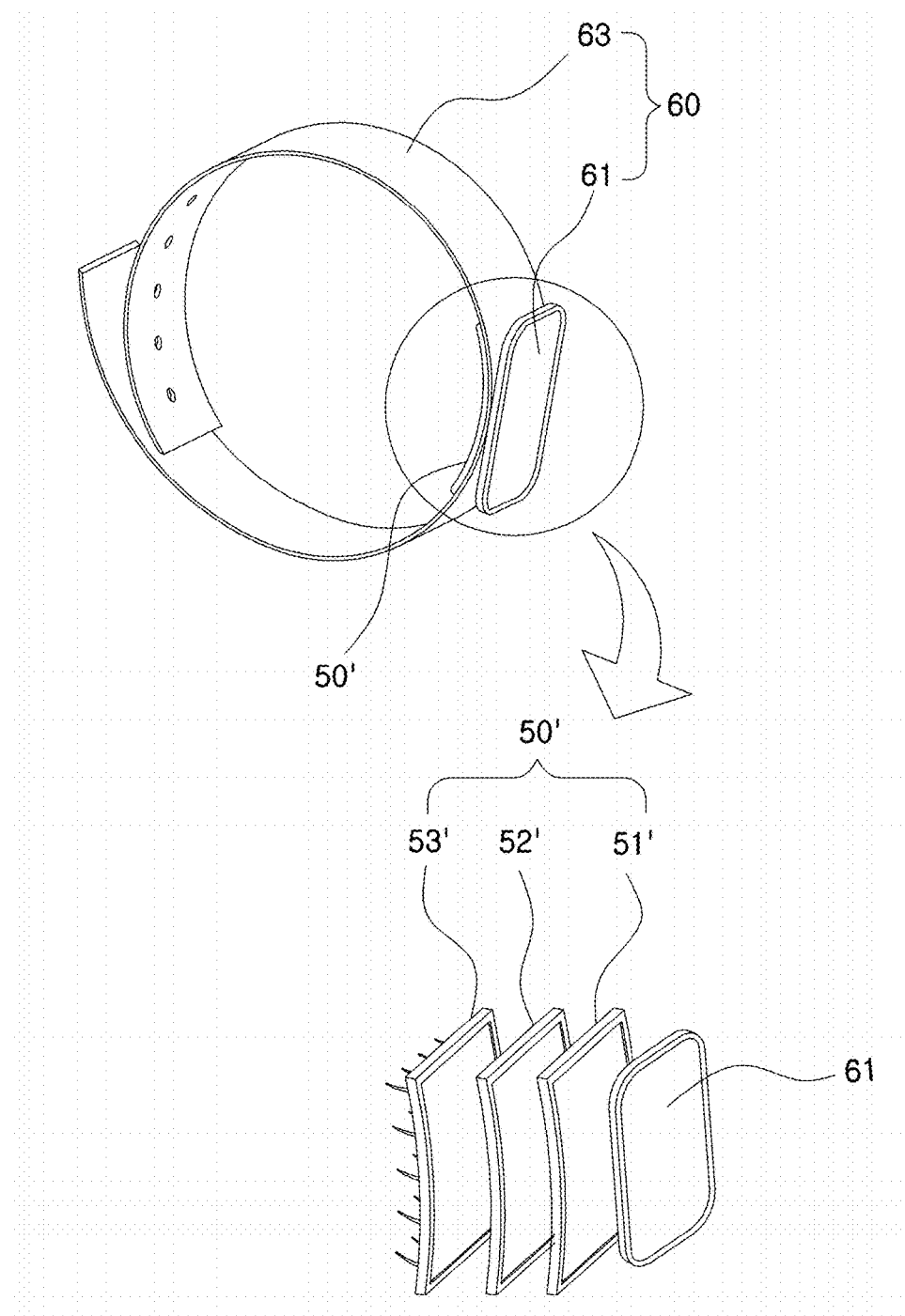
FIGS. 16 to 18 illustrate examples wherein a tactile information supply module according to embodiments of the present invention is applied.
Figure 17:
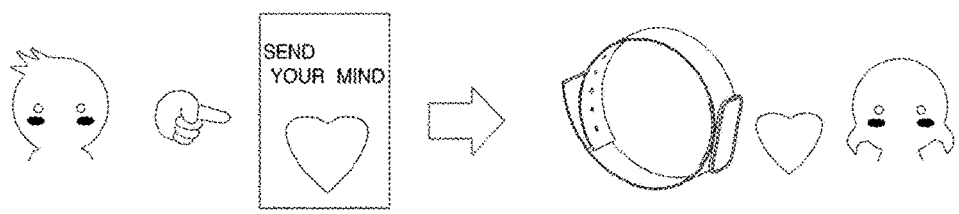
Figure 18:
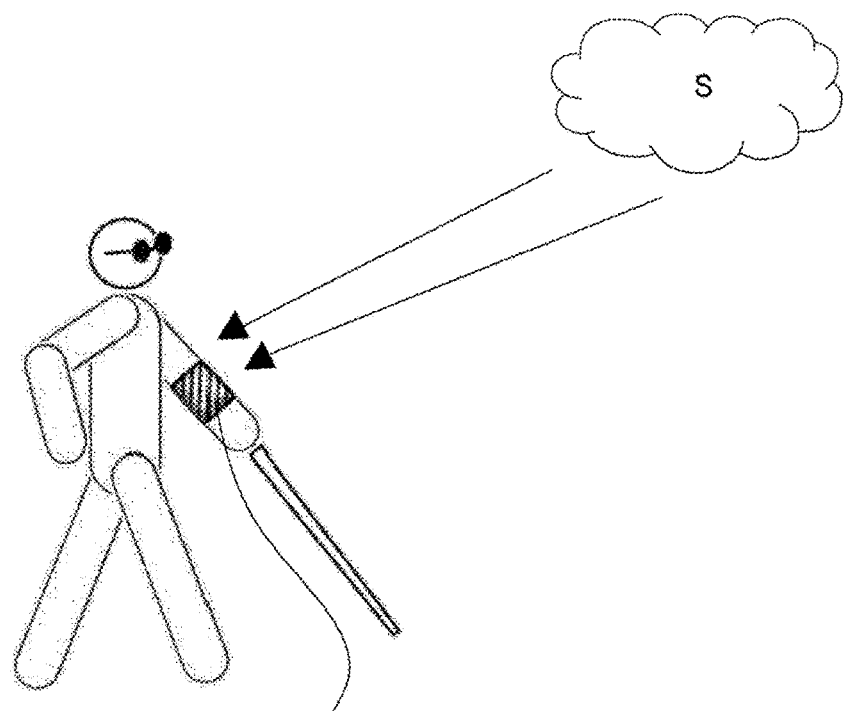

FIGS. 16 to 18 illustrate examples wherein the tactile information supply module 50, according to embodiments of the present invention is applied.

Referring to FIG. 16, the tactile information supply module 50 may be connected to a wearable device 60 such as a smart watch, a mobile device, etc. FIG. 16 illustrates the tactile information supply module 50' having a curvature similar to the curvature of a band 65 of the wearable device 60. The tactile information supply module 50' may be connected to a rear surface of a body 61 and the tactile sensation providers 1 may contact the user. The tactile information supply module 50' may be integrally provided with the wearable device 60, or may have a receiver 51 in the form of a terminal and be connected to the wearable device 60 through the terminal. Although the receiver 51', the controller 52', and the operator 53' are shown to be sequentially assembled to configure the tactile information supply module 50' in FIG. 16, each of the components may be separately connected to the wearable device 60.

FIG. 17 shows an example in which a couple exchanges tactile information using the tactile information supply module 50 of FIG. 16. When the man inputs "♡" through the wearable device 60 or an application of a mobile device, the receiver 51 included in the wearable device 60 of the woman may receive the message information that corresponds to the symbol "♡" and the controller 52 may convert the message information into a tactile signal (or a control signal), thereby providing "♡" as tactile information (tactile sensations) such as braille, handwriting, vibration, etc. The woman (i.e. the recipient) may immediately receive the message information sent by the man (i.e. the sender) even when she cannot directly operate the wearable device 60, for example, when she is in crowded public transportation or during exercise.

Referring to FIG. 18, the tactile information supply module 50 of the present invention may be used for visually impaired and blind people. When text messages or phone calls are received, tactile information may be provided in the form of handwriting, braille, or the like. In addition, in association with applications providing directional information, visually impaired and blind people can receive directional signals S such as go straight, turn left, turn right, or "crosswalk ahead", etc. when they walk on the street. Here, it will be beneficial that signals correspond to the plurality of operators 53, respectively. In addition, warning signals S, cautionary signals S, etc. may be provided as tactile information through, for example, a strong vibration.

Conventional text information providing devices for visually impaired and blind people have the disadvantages that they are heavy and large, provide braille information only, and the user must touch their devices for recognition of information or operation. However, the tactile information supply module 50 of the present invention is based on magnetic particles and a matrix material and therefore is light and flexible and thus may be used in flexible devices or wearable devices. In addition, the tactile information supply module 50 of the present invention is capable of providing various types of information including texts and geometric figures such as handwriting as well as braille information. Furthermore, the tactile information supply module 50 of the present invention is capable of providing external information as tactile information in real time without being touched by a user.

In addition to the above examples, the tactile information supply module 50 of the present invention may be applied to provide real-time tactile information for mobile devices, touchscreen devices, online games etc. in the information technology (IT) field, applied to driver assistance information feedback systems such as lane departure warning systems, front crash prevention systems, and overspeed protection systems, etc. in the car industry, and also applied to pulsimeters, measurement of the pressure distribution in human teeth, surgical robots, etc. in the medical field to transfer tactile sensations effectively.

Although the tactile sensation providers 1 are made of a material including the magnetic particles 2, a representative example of which is a magnetorheological elastomer (MRE), in the above description, the tactile sensation providers 1 may also be made of an electrorheological elastomer (ERE) and may operate equivalently by applying an external electric field by an electric field generator instead of the magnetic field generator 200. The ERE includes polarizable, piezoelectric particles in an elastomer and its characteristics such as stiffness may change in response to an externally applied electric field, which is similar to MREs.

An electric field generator (not shown) may generate an electric field and include at least one electrode unit (not shown). The electric field generator may be provided under the tactile unit 100 and the electrode units (not shown) may respectively correspond to the cells 110 of the tactile unit 100. Alternatively, a lower electrode (not shown) may be provided under the tactile unit 100, and an upper electrode (not shown), a film having an electrode pattern, or the like may be provided on the upper part or surface of the tactile unit 100. In addition, the position of the electric field generator (not shown) may vary as long as it is within the object that the electrode units (not shown) are respectively capable of applying electric fields to the cells 110 corresponding thereto.

As described above, according to the present invention, various types of tactile information may be more emotionally provided using various types of the tactile sensation providers 1.

Furthermore, according to the present invention, not only a simple vibration signal received from the outside, such as an alarm, but also complicated information, which corresponds to the cells 110, such as texts or geometric figures, may be provided as tactile information using the tactile unit 100 configured in the form of the cells 110. In addition, information such as text may be transferred to a location that contacts a user's skin, thereby effectively transferring secret information that is to be protected.

While the present invention has been particularly shown and described with reference to embodiments thereof, it will be understood by one of ordinary skill in the art that various changes in form and details may be made therein without departing from the spirit and scope of the invention as defined by the following claims. The embodiments should be considered in a descriptive sense only and not for purposes of limitation. Therefore, the scope of the invention is defined not by the detailed description of the invention but by the following claims, and all differences within the scope will be construed as being included in the present invention.

The invention claimed is:

1. A method comprising:
receiving message information;
transforming the message information into a tactile signal; and
actuating an operator to provide tactile information according to the tactile signal,
wherein the operator includes at least one tactile sensation provider comprising polarizable particles and a matrix material, and
wherein the tactile sensation provider provides the tactile information by being transformed in response to an external electric field.

2. The method of claim 1, wherein the matrix material is made of rubber or a polymer.

3. The method of claim 1, wherein the operator further comprises:
a tactile unit that contacts a user; and
an electric field generator for applying an electric field to the tactile unit,
wherein the at least one tactile sensation provider is connected to the tactile unit.

4. The method of claim 3, wherein the tactile unit includes at least one cell, and
wherein the electric field generator is disposed under the tactile unit.

5. The method of claim 4, wherein the electric field generator includes at least one coil unit that corresponds to the cell.

6. The method of claim 3, wherein the tactile sensation provider maintains a first shape when not influenced by the electric field, and
wherein the tactile sensation provider maintains a second shape when influenced by the electric field.

7. The method of claim 6, wherein at least one of a degree, a direction, and a frequency of the transformation from the first shape to the second shape is controlled by controlling at least one of an intensity, a direction, and a frequency of the electric field generated by the electric field generator.

8. The method of claim 1, wherein the tactile sensation provider is in a shape of at least one of a fine projection, an empty cylinder, a dome, a polyhedron, a plate, a leaf spring, a seesaw and a tunnel.

9. The method of claim 6, wherein the tactile sensation provider returns from the second shape to the first shape and produces a reciprocating motion by elastic force, thereby transferring the tactile information.

10. The method of claim 4, wherein the message information comprises a text, a geometric figure, a symbol, a warning, an alarm, or notice, and
wherein the operator provides the tactile information by sequentially or simultaneously applying/removing the electric field to/from each of the cells according to the tactile signal.

11. The method of claim 1, wherein the operator includes a plurality of operators, wherein the plurality of the operators provides different types of tactile information.

* * * * *